Figure 4:
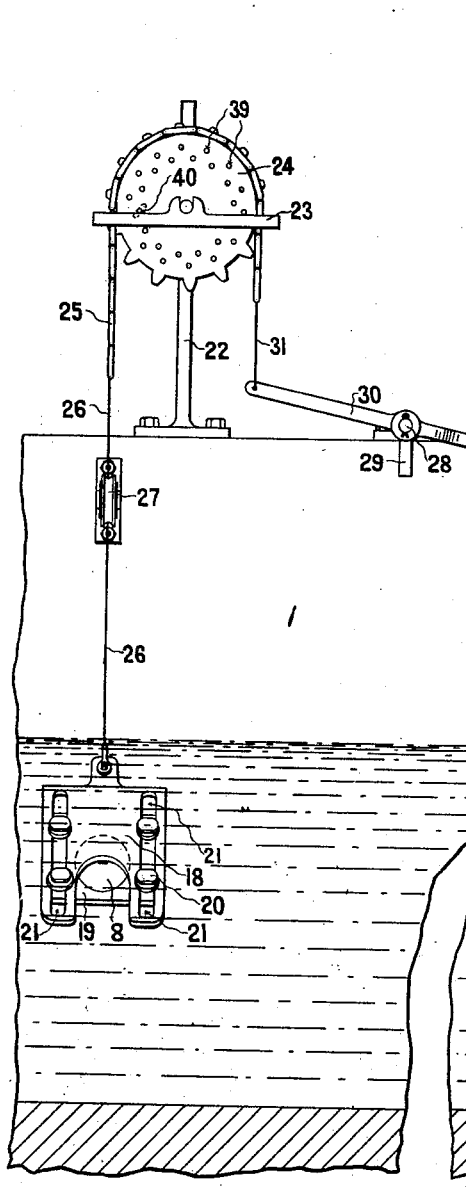

No. 733,746. PATENTED JULY 14, 1903.
T. H. RAMSDEN.
APPARATUS IN CONNECTION WITH SEWAGE OR LIKE TANKS.
APPLICATION FILED NOV. 12, 1902.
NO MODEL. 4 SHEETS—SHEET 1.
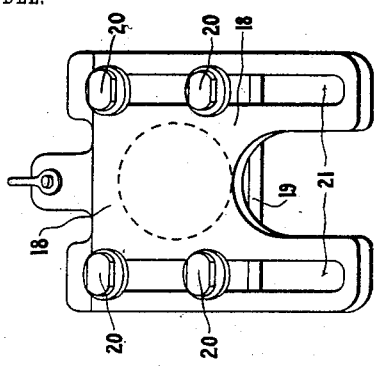
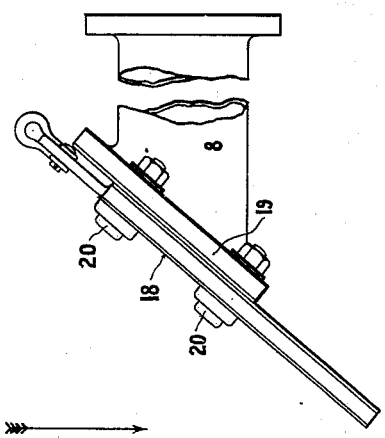
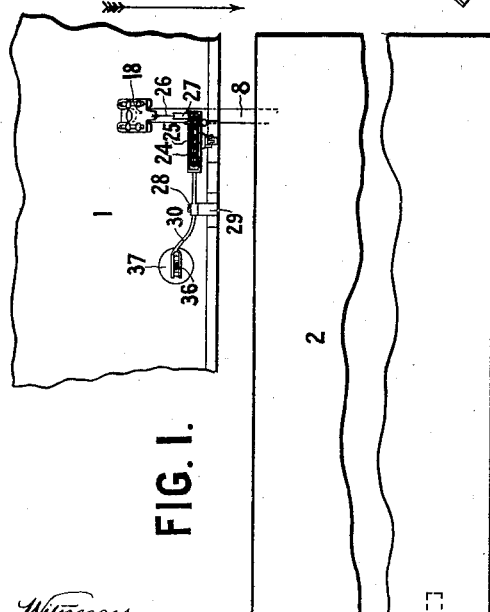
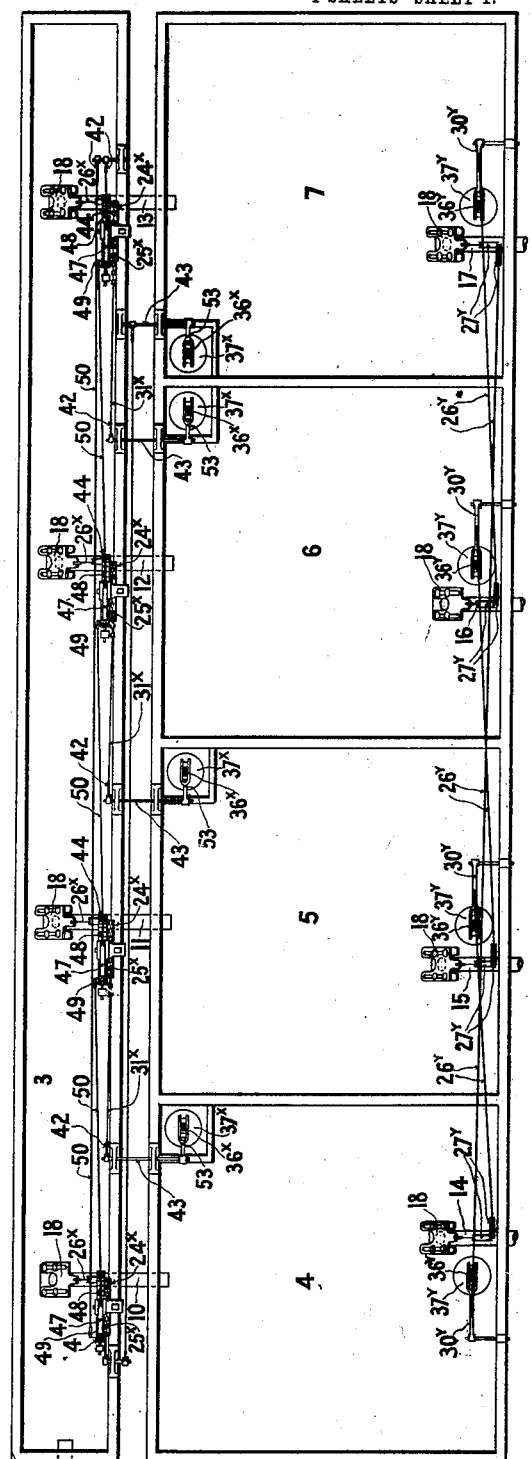
Witnesses
Inventor
Thomas H. Ramsden No. 733,746. PATENTED JULY 14, 1903.
T. H. RAMSDEN.
APPARATUS IN CONNECTION WITH SEWAGE OR LIKE TANKS.
APPLICATION FILED NOV. 12, 1902.
NO MODEL. 4 SHEETS—SHEET 2.

No. 733,746. PATENTED JULY 14, 1903.
T. H. RAMSDEN.
APPARATUS IN CONNECTION WITH SEWAGE OR LIKE TANKS.
APPLICATION FILED NOV. 12, 1902.
NO MODEL. 4 SHEETS—SHEET 3.
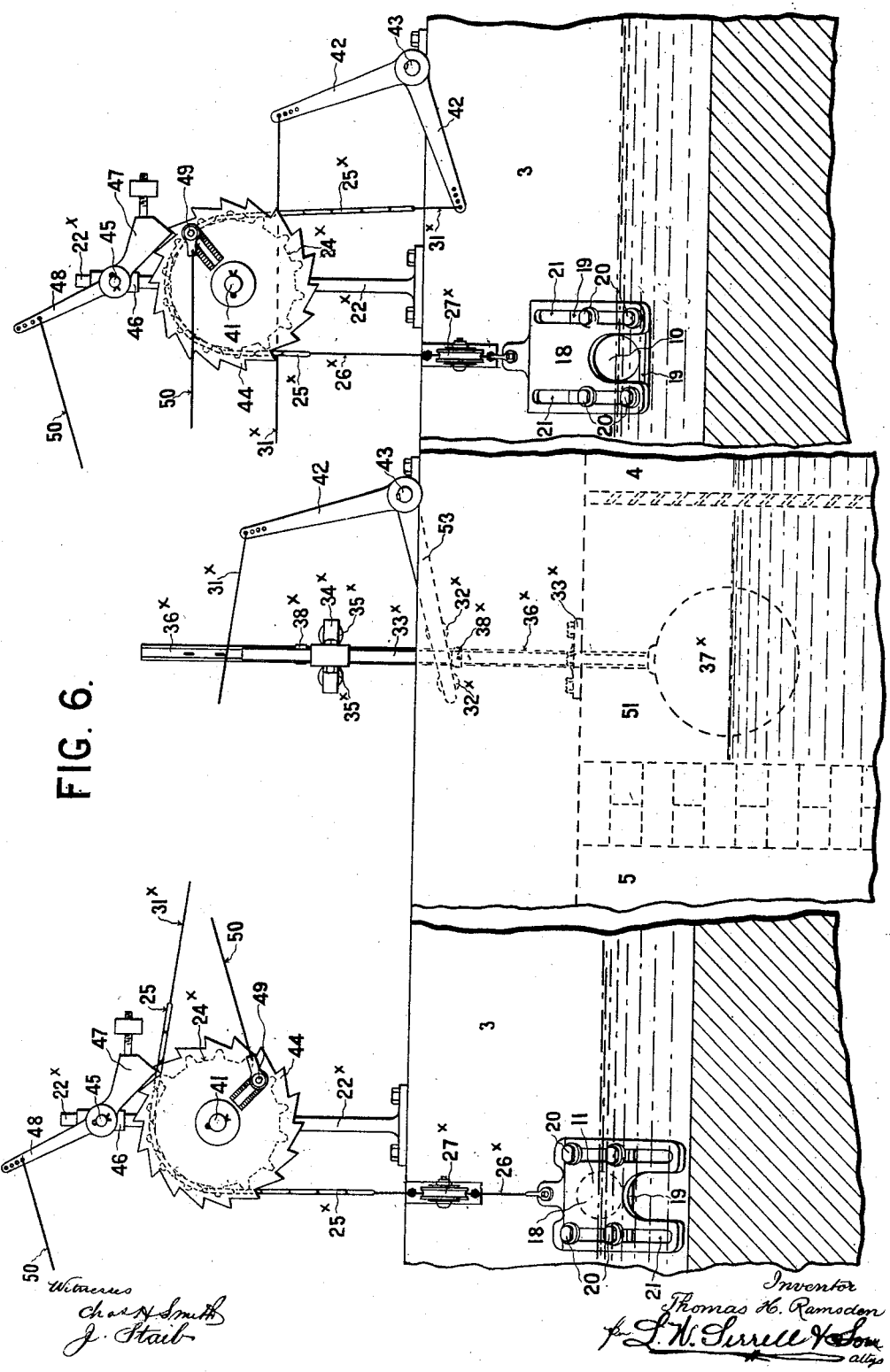

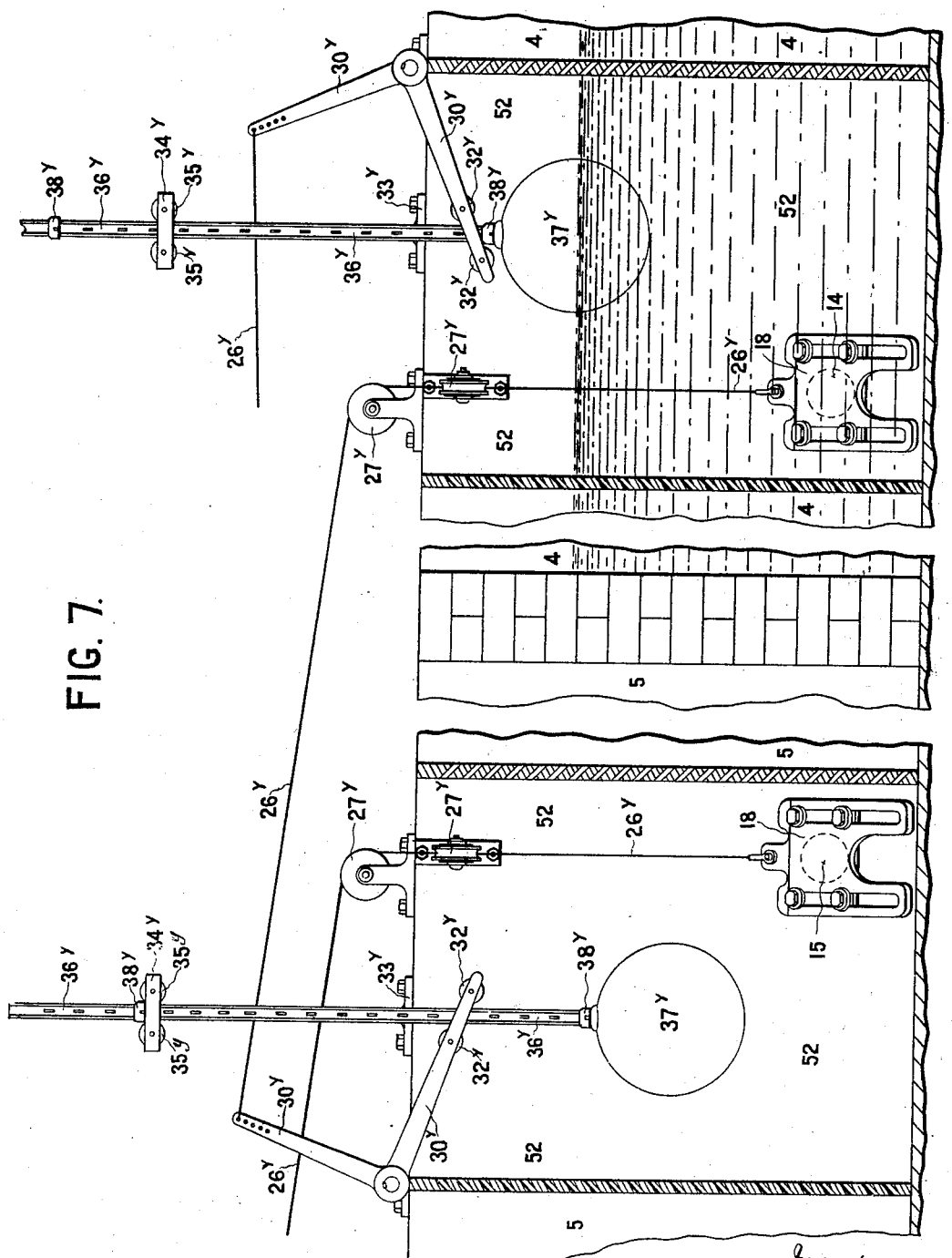

No. 733,746. Patented July 14, 1903.

UNITED STATES PATENT OFFICE.

THOMAS HENRY RAMSDEN, OF BRAMHOPE, NEAR LEEDS, ENGLAND.

APPARATUS IN CONNECTION WITH SEWAGE OR LIKE TANKS.

SPECIFICATION forming part of Letters Patent No. 733,746, dated July 14, 1903.

Application filed November 12, 1902. Serial No. 130,969. (No model.)

*To all whom it may concern:*

Be it known that I, THOMAS HENRY RAMSDEN, a subject of the King of Great Britain and Ireland, residing at Bramhope, near Leeds, in the county of York, England, have invented certain new and useful Apparatus in Connection with Sewage or Like Tanks, (for which I have made application for a patent in Great Britain, No. 9,247, bearing date April 22, 1902,) of which the following is a specification.

In the bacterial treatment of sewage the system of tanks may consist of a settling-tank or first receiver, from which the effluent is passed continuously to a septic-tank, from which the effluent is fed to each of a series of open bacterial tanks in succession, which latter tanks are permitted to stand full for a given time, and when the desired amount of purification has taken place the said tanks are successively discharged and allowed to remain empty and at rest for a suitable period before receiving a further supply.

In the practical management of sewage with a system of tanks, as above described, it is desirable, both for the sake of economy and regularity, that the inflow and discharge from the separate tanks should take place automatically. The effecting of this automatic operation of the tanks, however, is met with considerable difficulties, among which is the constant variation in the quantity of sewage to be treated, owing chiefly to the variation in rainfall, as it is obvious that a set of tanks arranged to treat a comparatively small amount of sewage will be wholly inadequate at the time when a heavy fall of rain causes a large amount of flood-water to come down to the sewage.

Now my invention relates, first, to apparatus in connection with the settling-tank or first receiver, consisting in providing the discharge-pipe with a suitable valve which is capable of being automatically opened by means of a float contained in the said tank through the medium of certain intermediate mechanism for effecting a variable delivery to the first tank, both as to predetermined quantity and conditions of flow, and, secondly, to a trough and apparatus in connection therewith, consisting in providing the trough with discharge-pipes which communicate with the series of tanks, having suitable valves which are capable of being automatically opened by means of floats contained in the adjacent tanks through the medium of certain intermediate mechanism and also of being automatically released by certain other mechanism for feeding the effluent from the trough to each of the tanks successively, and, further, to apparatus in connection with the series of tanks, consisting in providing their discharge-pipes with suitable valves which are capable of being automatically opened by means of floats contained in the said tanks through the medium of certain intermediate mechanism for effecting the discharge of each tank successively. In this way the various tanks may be allowed to fill and discharge automatically at the desired times for a normal or dry-weather flow, said apparatus being so contrived as to automatically deal with an increased quantity of sewage in case of a storm or other excess flow and then automatically return to the normal state on the excess flow subsiding in the settling-tank or first receiver.

Figure 5:
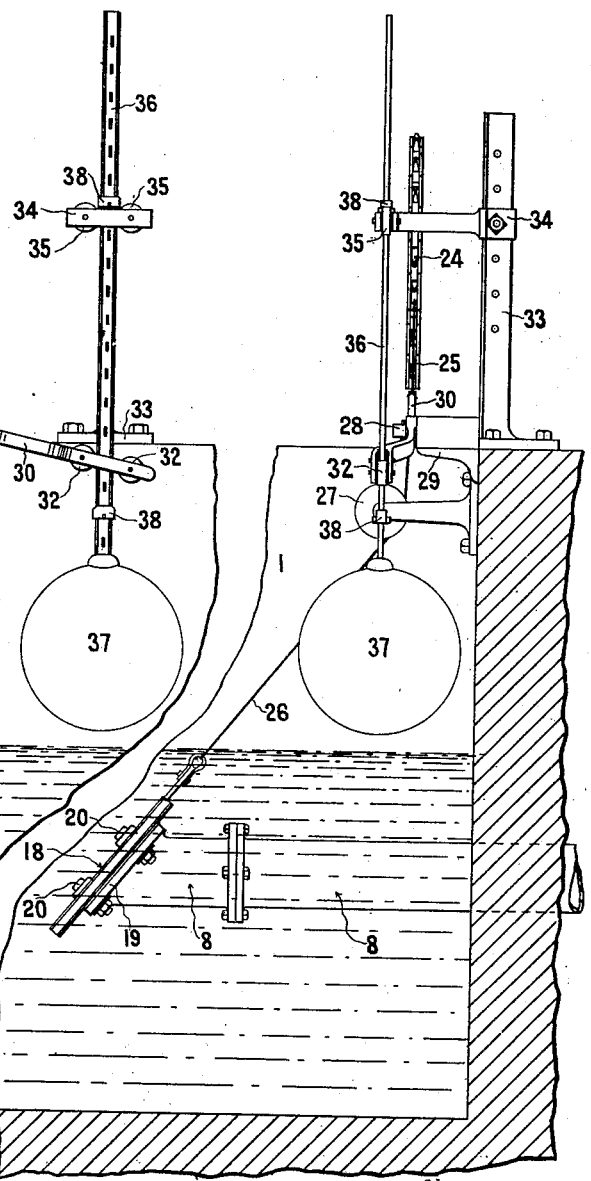

In the drawings, Figure 1 is a plan view, on a reduced scale, showing a system of tanks such as that hereinbefore referred to, together with the trough and mechanism in connection with the trough and tanks for effecting the desired automatic inflow and discharge. Figs. 2 and 3 are respectively a side elevation and front elevation showing the type of valve I employ arranged in connection with a discharge-pipe. Figs. 4 and 5 show in sectional elevation and transverse section, respectively, a portion of the settling-tank with its discharge-pipe and valve, together with the mechanism for automatically operating the latter. Fig. 6 is a sectional elevation showing portions of the trough with its discharge-pipes and their valves and a portion of the tanks, together with the mechanism for automatically operating the said valves; and Fig. 7 is a sectional elevation showing the portions of the tanks with their discharge-pipes and valves, together with the mechanism for automatically operating the said valves. Figs. 4, 6, and 7 are taken looking in the direction of the arrow, Fig. 1.

In Fig. 1 the settling-tank is represented at 1, a septic-tank at 2. 3 is a trough, and 4, 5, 6, and 7 are bacterial tanks. The effluent is passed from the settling-tank 1 by way of a discharge-pipe 8 to the septic-tank 2, and from the latter by way of the connecting-pipe 9 to the trough 3, which latter communicates with the various bacterial tanks 4, 5, 6, and 7 by way of discharge-pipes 10, 11, 12, and 13, the said tanks 4, 5, 6, and 7 being also provided with discharge-pipes 14, 15, 16, and 17. Each of the discharge-pipes is provided with a valve 18 of the type shown at Figs. 2 and 3, in which figures, 8 is the discharge-pipe, the mouth of which is formed with a flange 19, situated obliquely to the axis of the pipe, and on the face of this flange 19 the valve 18 is arranged to slide, studs 20, fixed in the flange 19 and passing through slot-holes 21 in the valve, being employed for retaining the said valve in position and also for admitting of its required sliding movement, while the weight of the said valve 18 is such as to tend to keep the same in the down position, covering the oval mouth of the discharge-pipe 8, as shown.

Referring to Figs. 4 and 5, 1 is a settling-tank into which the sewage is first discharged, and 8 is a discharge-pipe provided with a valve 18 of the description hereinbefore referred to. On the wall of the tank 1 I fix a standard 22, provided with an adjustable bracket 23, in which is rotatably mounted a chain-wheel 24, which is provided with a pitch-chain 25, one end of the said chain being connected to the upper part of the valve 18 by means of a wire 26, which passes thereto by way of a guide-pulley 27. On a stud 28 of a bracket 29 I pivot a double-ended lever 30, to one end of which the opposite end of the chain 25 to that which is connected to the valve 18 is attached by means of a wire 31, while the other arm of the lever 30 is forked and provided with runners 32 32. On the wall of the tank 1 I fix a second standard 33, carrying an adjustable bracket 34, provided with runners 35 35, between which is mounted a rod 36, carrying a float 37 at its lower end, which float also passes between the runners 32 32 of the lever 30, and the said float-rod 36 is provided with collars 38 38, which are adjustable thereon. The wheel 34 has holes 39 formed in the same, suitable for receiving a stop-pin 40.

In the drawings I have shown the apparatus set for a normal or dry-weather flow, in which the valve 18 is held up, so as to uncover half of the oval section of the discharge-pipe 8 by the stop-pin 40 in the wheel 24, engaging the bracket 23 and so preventing the valve 18 sliding down upon its flange 19 of the pipe 8, whereby a continuous desired flow to the first tank is obtained. Should an increased quantity of sewage be delivered to the tank 1, the float 37 will be raised in proportion to the rise of sewage in the tank, with the result that on the lower collar 38 of the float-rod 36 engaging the arm of the double-ended lever 30 the same will be rocked on its stud 28, causing the opposite arm of the lever 30 to be depressed, thus drawing forward the chain 25, rotating the chain-wheel 24, and raising the valve 18 through the medium of the wire 26 and so uncovering the oval section of the discharge-pipe 8 to the required amount, while on the excess flow subsiding the float 37 will lower and allow the parts to return to their normal positions, with the valve 18 at half-open. Additional stop-pins may be inserted in the holes 39 of the wheel 24 for the purpose of limiting the amount of movement of the said pulley, and thus limiting the extent to which the discharge-valve 18 may be opened, and it will be seen that by adjusting the stop-pin 40 in its wheel 24 a variable delivery to the first tank may be effected, both as to predetermined quantity and conditions of flow.

Referring to Figs. 6 and 7, 3 is a trough, and 4 and 5 are two of the tanks in the series, and in the drawings I have shown that portion of the trough 3, provided with the discharge-pipes 10 and 11, by which the effluent is discharged into the said tanks 4 and 5, the latter being provided with the discharge-pipes 14 and 15. Each of the discharge-pipes is provided with a valve 18 of the description hereinbefore referred to, and on the wall of the trough 3 (see Fig. 6) immediately over each of the valves 18 I fix a standard $22^x$, provided with an adjustable bracket carrying a stud 41, on which is rotatably mounted a chain-wheel $24^x$, provided with a pitch-chain $25^x$, one end of the said chain being connected to the upper part of the valve 18 by means of a wire $26^x$, which passes thereto by way of a guide-pulley $27^x$, while the opposite end of the said chain $25^x$ is connected by a wire $31^x$ to an arm 42, mounted on a rock-shaft 43 of the preceding tank, which shaft extends across from the trough 3 to the tank opposite and is carried by suitable brackets located on their respective walls. On the stud 41 I mount a ratchet-wheel 44, which is attached to the chain-wheel $24^x$, and on a stud 45 of an adjustable bracket 46 on the standard $22^x$ I pivot a pawl 47, which engages the ratchet-wheel 44, and the said pawl 47 is formed with a lever 48. Each ratchet-wheel 44 is provided with an adjustable pin 49, which is connected by a wire 50 to the pawl-lever 48 of the preceding ratchet-wheel 44. On the wall of each of the tanks 4, 5, 6, and 7 (the wall nearest to the trough) I fix a standard $33^x$, carrying an adjustable bracket $34^x$, provided with runners $35^x$ $35^x$, between which is mounted a rod $36^x$, carrying a float $37^x$ at its lower end within the tank, which float-rod $36^x$ also passes between runners $32^x$ $32^x$, located on an arm 53, mounted on the rock-shaft 43, and the said float-rod $36^x$ is provided with collars $38^x$ $38^x$, which are adjustable thereon. The float $37^x$ of each tank in the series is inclosed by a perforated casing 51. On the opposite wall of each of the tanks 4, 5, 6, and 7 to that just referred to (see Fig. 7) I fix a standard $33^y$, carrying an adjustable bracket $34^y$, provided with runners 35$^y$ 35$^y$, between which is mounted a rod 36$^y$, carrying a float 37$^y$ at its lower end within the tank, which float-rod 36$^y$ also passes between runners 32$^y$ 32$^y$, located on the forked end of one arm of a bell-crank rocking lever 30$^y$, while the other arm of the said lever is connected to the upper part of the valve 18 of the preceding tank by means of wire 26$^y$, which passes thereto by way of guide-pulleys 27$^y$ 27$^y$, and the said float-rod 36$^y$ is provided with collars 38$^y$ 38$^y$, which are adjustable thereon. The valve 18 and float 37$^y$ of each tank are inclosed by a perforated casing 52. I have assumed that the effluent is flowing into the trough 3 from the tank 1 continuously by way of the septic-tank 2, from which trough 3 it is to be fed into the tanks 4, 5, 6, and 7 in succession, and in the drawings the mechanism at Figs. 6 and 7 is shown in position, assuming tank 7, Fig. 1, to be full, with the valve 18 of the discharge-pipe 13 of the trough 3 in the down position, covering the mouth of the said discharge-pipe 13, while the valve 18 of the discharge-pipe 10 of the trough 3 is at full open, so that tank 4 is being filled. Now as the sewage rises in tank 4 (see Fig. 6) its float 37$^x$, contained in the casing 51, rises in proportion, with the result that the lower collar 38$^x$ on the float-rod 36$^x$ engages and raises the arm 53 when the shaft 43 and its lever 42 is rocked back, thus drawing forward the wire 31$^x$ and chain 25$^x$, rotating the wheel 24$^x$ and ratchet-wheel 44, whereby the valve 18 of the discharge-pipe 11 is raised to effect the discharge into tank 5, and simultaneously with this action the wire 50, in connection with the pin 49 on the said rotated wheel 44, pulls on the lever 48 of the pawl 47, in connection with the gear of the outlet 10, and so rocks the said pawl 47 on its pivot 45 and liberates the ratchet-wheel 44, when the valve 18 of the outlet 10 slides down and covers the said outlet, and this automatic action of opening and closing the valves 18 of the discharge-pipes 10, 11, 12, and 13 in the trough 3 is continued, so as to fill the tanks 4, 5, 6, and 7 successively throughout the cycle of tanks. As tank 4 fills (see Fig. 7) the float 37$^y$, contained in the casing 52 on the discharge side of the said tank, rises and rocks its bell-crank lever 30$^y$, which pulls forward the wire 26$^y$ and raises the valve 18, in connection with the discharge-pipe 17 of the tank 7, Fig. 1, whereby the latter is emptied, and on tank 5 filling the float 37$^y$ therein on rising rocks its bell-crank lever 30$^y$ and pulls forward the wire 26$^y$ and raises the valve 18 of the discharge-pipe 14 of the tank 4 to empty the same, and so on in succession throughout the cycle of tanks.

By employing the automatic apparatus above described the tanks in the series may be filled in succession, and by adjusting the valve in connection with the discharge-pipe of the first receiver proportionately to the capacity of the series of tanks the said tanks are filled, stand full, and stand empty for predetermined periods of time.

I have now described by way of example a complete set of gear as applied to the system of tanks illustrated at Fig. 1 of the drawings; but it is obvious that my arrangement of apparatus will be equally applicable to any number of tanks, which number can only be determined by the needs of any particular district, and, further, I may, if desired, employ the gear described with reference to Figs. 4 and 5 apart from the gear described with reference to Figs. 6 and 7 for effecting a continuous flow to systems of treatment other than that of a series of change-tanks.

Having now described my invention, what I claim as new, and desire to secure by Letters Patent, is—

1. In combination with a sewage settling-tank or the like receiver having a discharge-pipe, a slide-valve located on the mouth of the discharge-pipe, a chain attached to the upper part of the said valve and passing over a chain-wheel, with which it engages, to one arm of a double-ended rocking lever, a float located within the tank having its rod arranged to engage the opposite or free arm of the double-ended rocking lever, standards on the wall of the tank provided with brackets respectively carrying the chain-wheel and the float-rod, said chain-wheel being formed with holes for the reception of stop-pins, whereby an automatic variable delivery is effected both as to predetermined quantity and conditions of flow, substantially as described.

2. In combination with a system of sewage-tanks, a trough located between the continuously-discharging tank or first receiver and the series of change-tanks, a separate discharge-pipe connecting the trough to each of the change-tanks, a slide-valve located on the mouth of each discharge-pipe, a chain attached to the upper part of the valve and passing over a chain-wheel, with which it engages, to a lever located on a rock-shaft in connection with the tank of the preceding trough-outlet, a float located within the said preceding tank having its rod arranged to engage a lever on the said rock-shaft, standards on the wall of the trough and tank respectively provided with brackets carrying the chain-wheel and the float-rod, a ratchet-wheel attached to the chain-wheel provided with an engaging pawl pivoted on the chain-wheel standard, and a pin on the ratchet-wheel connected to the pawl-lever of the preceding discharge-pipe gear of the trough, whereby the effluent is automatically fed from the trough to each of the tanks successively, substantially as described.

3. In combination with a series of sewage change-tanks having a separate discharge-pipe to each tank, a slide-valve located on the mouth of each discharge-pipe, a wire attached to the upper part of the valve and passing by way of guide-pulleys to one arm of a bell-crank lever in the subsequent tank, a float located within the said subsequent tank having its rod arranged to engage the other arm of the said bell-crank lever, a standard on the wall of the tank provided with a bracket carrying the float-rod, whereby the effluent is automatically discharged from each of the tanks successively, substantially as described.

In witness whereof I have hereunto set my hand in presence of two witnesses.

THOMAS HENRY RAMSDEN.

Witnesses:
    JOHN JOWETT,
    FRANCES D. BARRACLOUGH.